(12) United States Patent
Rong et al.

(10) Patent No.: US 9,769,247 B2
(45) Date of Patent: Sep. 19, 2017

(54) APPLICATION DISTRIBUTION METHOD, TERMINAL, AND SERVER

(71) Applicant: Huawei Technologies Co., Ltd., Shenzhen (CN)

(72) Inventors: Guoqiang Rong, Shenzhen (CN); Wenwu Ye, Shenzhen (CN); Zijun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 14/522,107

(22) Filed: Oct. 23, 2014

(65) Prior Publication Data

US 2015/0046918 A1 Feb. 12, 2015

Related U.S. Application Data

(63) Continuation of application No. PCT/CN2012/085070, filed on Nov. 22, 2012.

(51) Int. Cl.
*H04L 29/08* (2006.01)
*G06F 9/445* (2006.01)

(52) U.S. Cl.
CPC .............. *H04L 67/10* (2013.01); *G06F 8/61* (2013.01); *H04L 67/22* (2013.01); *H04L 67/34* (2013.01); *H04L 67/20* (2013.01)

(58) Field of Classification Search
None
See application file for complete search history.

(56) References Cited

U.S. PATENT DOCUMENTS

| 2004/0093595 | A1 | 5/2004 | Bilange |
| 2007/0055675 | A1* | 3/2007 | Oosawa ................. G06F 21/10 |
| 2011/0034188 | A1 | 2/2011 | Bengtsson et al. |
| 2011/0067023 | A1* | 3/2011 | Chiyo ................ H04N 1/00222 |
| | | | 717/177 |

(Continued)

FOREIGN PATENT DOCUMENTS

| CN | 101438566 | 5/2009 |
| CN | 101754106 A | 6/2010 |

(Continued)

OTHER PUBLICATIONS

Extended European Search Report, Application No. 12888789.0, Applicant Huawei Technologies Co., Ltd., date of mailing Mar. 18, 2015.

*Primary Examiner* — Lewis A Bullock, Jr.
*Assistant Examiner* — Bruce S Ashley
(74) *Attorney, Agent, or Firm* — Slater Matsil, LLP

(57) ABSTRACT

The present invention discloses an application distribution method, a terminal, and a server. The method includes: sending, by a first terminal, a distribution request to an application distribution server; when the distribution request satisfies a preset criterion of the application distribution server, receiving at least one propagation code sent by the application distribution server; and sending the propagation code to a second terminal, so that the second terminal completes registration, running, and tracking of an application according to the propagation code. The present invention can be applied to an intelligent terminal for acquiring and distributing an application, however, the present invention is not limited thereto.

11 Claims, 7 Drawing Sheets

(56) References Cited

U.S. PATENT DOCUMENTS

| | | | |
|---|---|---|---|
| 2011/0078773 A1 | 3/2011 | Bhasin et al. | |
| 2011/0300834 A1 | 12/2011 | Ni | |
| 2012/0214451 A1 | 8/2012 | Richardson et al. | |
| 2012/0303476 A1* | 11/2012 | Krzyzanowski | G06F 8/60 705/26.5 |
| 2012/0311675 A1* | 12/2012 | Ham | G06F 8/61 726/4 |

FOREIGN PATENT DOCUMENTS

| | | |
|---|---|---|
| CN | 101959179 A | 1/2011 |
| CN | 201750554 U | 2/2011 |
| EP | 2187363 A1 | 5/2010 |
| KR | 20100057733 A | 6/2010 |
| KR | 101116582 B1 | 3/2012 |
| KR | 20120114636 A | 10/2012 |
| WO | 2007131540 A1 | 11/2007 |

* cited by examiner

APPLICATION DISTRIBUTION METHOD, TERMINAL, AND SERVER

This application is a continuation of International Application No. PCT/CN2012/085070, filed on Nov. 22, 2012, which is hereby incorporated by reference in its entirety.

TECHNICAL FIELD

The present invention relates to the field of communications technologies, and in particular, to an application distribution method, a terminal, and a server.

BACKGROUND

With the popularity of intelligent terminal devices, more applications can be used by the intelligent terminals. Currently, the number of applications provided in each of the two mainstream platforms, that is, Apple (IOS) platform and Android (Android) platform exceeds 700,000, and to make it easier for a user to find and use these applications, both Apple and Android provide corresponding application stores, in which applications are managed by category to provide the user with a convenient channel for acquiring an application. The user only needs to search the Internet for a required application and then downloads and installs the application for use.

Currently, the applications in the application stores are numerous and diversified, and even if the applications are managed by category, the user generally can only view some popular programs that rank high, so it takes a lot of screening and search work to find an actually needed application. This is quite complex, lowers user experience, and also limits propagation efficiency of an application.

SUMMARY

An application distribution method, an apparatus, and a system are provided, which can solve the problem that it is difficult for a user to acquire an application due to a limited acquiring channel, and make a user of an application become a distribution channel of the application, thereby improving user experience and propagation efficiency of the application.

In a first aspect, an application distribution method is provided, which includes sending, by a first terminal, a distribution request to an application distribution server. When the distribution request satisfies a preset criterion of the application distribution server, receiving at least one propagation code sent by the application distribution server. The method further includes sending the propagation code to a second terminal, so that the second terminal applies, according to the propagation code, to the application distribution server for installation and registration of an application and runs and tracks the application.

In a first possible implementation manner, the distribution request at least carries a first user identifier, a requested service category, and a hardware feature and/or a software feature of a terminal device, where the first user identifier includes: a user telephone number and/or ID information, the hardware feature of the terminal device includes: a manufacturer serial number, and the software feature of the terminal device includes: an operating system version number.

Further, the method further includes: when the distribution request does not satisfy the preset criterion of the application distribution server, receiving a failure message sent by the application distribution server; and stopping the distribution applying process.

Further, the sending the propagation code to a second terminal includes sending the propagation code to the second terminal through short-distance communication. Alternatively, the propagation code is sent to the Internet, so that the second terminal acquires the propagation code.

The propagation code is used for identifying a category of an application, describing a feature of the application, and identifying the first user identifier and a propagation sequence number.

The application is a soft SIM card.

With reference to the first aspect or the first possible implementation manner of the first aspect, in a second possible implementation manner, the distribution request satisfying the preset criterion of the application distribution server includes that: if the requested service category belongs to a service category included in the application distribution server, and the manufacturer serial number of the terminal device and/or the operating system version number of the terminal device is the same as a set manufacturer serial number and/or operating system version number of the application distribution server, the distribution request satisfies the preset criterion of the application distribution server.

In a second aspect, an application distribution method is provided, which includes receiving a distribution request sent by a first terminal. When the distribution request satisfies a preset criterion, at least one propagation code is sent to the first terminal, so that the first terminal propagates the propagation code to a second terminal.

In a first possible implementation manner, the distribution request at least carries a first user identifier, a requested service category, and a hardware feature and/or a software feature of a terminal device, where the first user identifier includes a user telephone number and/or ID information. The hardware feature of the terminal device includes a manufacturer serial number, and the software feature of the terminal device includes an operating system version number.

Further, the method further includes: when the distribution request does not satisfy the preset criterion, sending a failure message to the first terminal.

Further, the method further includes: receiving a registration request sent by the second terminal, where the registration request at least carries the propagation code and a second user identifier.

Further, the method further includes: receiving a running and tracking request sent by the second terminal, where the running and tracking request at least carries the propagation code and the second user identifier.

The propagation code is used for identifying a category of an application, describing a feature of the application, and identifying the first user identifier and a propagation sequence number.

The application is a soft SIM card.

Further, after the receiving a registration request sent by the second terminal, the method further includes: sending soft SIM card data to the second terminal.

With reference to the second aspect or the first possible implementation manner of the second aspect, in a second possible implementation manner, the distribution request satisfying the preset criterion includes that: if the requested service category belongs to a service category included in a server, and the manufacturer serial number of the terminal device and/or the operating system version number of the terminal device is the same as a set manufacturer serial number and/or operating system version number of the server, the distribution request satisfies the preset criterion.

In a third aspect, an application distribution method is provided, which includes acquiring a propagation code released by a first terminal, and sending a registration request to an application distribution server to apply for installation and registration of an application. The registration request at least carries the propagation code and a second user identifier. After the registration is successful and whenever the application runs, sending a running and tracking request to the application distribution server, where the running and tracking request at least carries the propagation code and the second user identifier.

In a first possible implementation manner, the acquiring a propagation code released by a first terminal includes receiving the propagation code from the first terminal through short-distance communication; or, acquiring, through the Internet, the propagation code released by the first terminal.

The application is a soft SIM card.

Further, after the sending a registration request to an application distribution server, the method further includes receiving soft SIM card data sent by the application distribution server, and importing the soft SIM card data into a soft SIM card application.

In a fourth aspect, a terminal device is provided, which includes a sending module, configured to send a distribution request to an application distribution server. The sending module is configured to send a propagation code to a second terminal, so that the second terminal applies, according to the propagation code, to the application distribution server for installation and registration of an application and runs and tracks the application. A receiving module is configured to receive at least one propagation code sent by the application distribution server when the distribution request sent by the sending module satisfies a preset criterion of the application distribution server.

In a first possible implementation manner, the distribution request sent by the sending module at least carries a first user identifier, a requested service category, and a hardware feature and/or a software feature of the terminal device, where the first user identifier includes: a user telephone number and/or ID information, the hardware feature of the terminal device includes: a manufacturer serial number, and the software feature of the terminal device includes: an operating system version number.

Further, the receiving module is further configured to: when the distribution request sent by the sending module does not satisfy the preset criterion of the application distribution server, receive a failure message sent by the application distribution server. The terminal device further includes a processing module, configured to stop the distribution applying process after the receiving module receives the failure message.

Further, the sending module is further configured to: send the propagation code received by the receiving module to the second terminal through short-distance communication; or, send the propagation code received by the receiving module to the Internet, so that the second terminal acquires the propagation code.

The propagation code is used for identifying a category of an application, describing a feature of the application, and identifying the first user identifier and a propagation sequence number.

The application is a soft SIM card.

With reference to the fourth aspect or the first possible implementation manner of the fourth aspect, in a second possible implementation manner, the distribution request satisfying the preset criterion of the application distribution server includes that: if the requested service category belongs to a service category included in the application distribution server, and the manufacturer serial number of the terminal device and/or the operating system version number of the terminal device is the same as a set manufacturer serial number and/or operating system version number of the application distribution server, the distribution request satisfies the preset criterion of the application distribution server.

In a fifth aspect, a server is provided, which includes a receiving module configured to receive a distribution request sent by a first terminal, a determining module configured to determine whether the distribution request received by the receiving module satisfies a preset criterion, and a sending module configured to send at least one propagation code to the first terminal when the determining module determines that the distribution request satisfies the preset criterion.

In a first possible implementation manner, the distribution request received by the receiving module at least carries a first user identifier, a requested service category, and a hardware feature and/or a software feature of a terminal device, where the first user identifier includes a user telephone number and/or ID information. The hardware feature of the terminal device includes a manufacturer serial number, and the software feature of the terminal device includes an operating system version number.

Further, the sending module is further configured to send a failure message to the first terminal when the determining module determines that the distribution request does not satisfy the preset criterion.

Further, the receiving module is further configured to receive a registration request sent by a second terminal. The registration request at least carries the propagation code and a second user identifier.

Further, the receiving module is further configured to: receive a running and tracking request sent by the second terminal, where the running and tracking request at least carries the propagation code and the second user identifier.

The propagation code is used for identifying a category of an application, describing a feature of the application, and identifying the first user identifier and a propagation sequence number.

The application is a soft SIM card.

Further, the sending module is further configured to after the receiving module receives the registration request sent by the second terminal, send soft SIM card data to the second terminal.

With reference to the fifth aspect or the first possible implementation manner of the fifth aspect, in a second possible implementation manner, the determining module is specifically configured to: when the requested service category belongs to a service category included in the server, and the manufacturer serial number of the terminal device and/or the operating system version number of the terminal device is the same as a set manufacturer serial number and/or operating system version number of the server, determine that the distribution request satisfies the preset criterion.

In a sixth aspect, a terminal device is provided, which includes an acquiring module, configured to acquire a propagation code released by a first terminal. A sending module is configured to send a registration request to an application distribution server to apply for installation and registration of an application. The registration request at least carries the propagation code acquired by the acquiring module and a second user identifier. The sending module is configured to, after the registration is successful and whenever the application runs, send a running and tracking request to the application distribution server. The running and tracking request at least carries the propagation code acquired by the acquiring module and the second user identifier.

In a first possible implementation manner, the acquiring module is further configured to: receive the propagation code from the first terminal through short-distance communication; or, acquire, through the Internet, the propagation code released by the first terminal.

The application is a soft SIM card.

Further, the terminal device further includes a processing module configured to, after the sending module sends the registration request to the application distribution server, receive soft SIM card data sent by the application distribution server, and import the soft SIM card data into a soft SIM card application.

In a seventh aspect, a terminal device is provided, which includes a sender, configured to send a distribution request to an application distribution server; and configured to send a propagation code to a second terminal, so that the second terminal applies, according to the propagation code, to the application distribution server for installation and registration of an application and running and tracking of the application. A receiver is configured to, when the distribution request sent by the sender satisfies a preset criterion of the application distribution server, receive at least one propagation code sent by the application distribution server.

In a first possible implementation manner, the distribution request sent by the sender at least carries a first user identifier, a requested service category, and a hardware feature and/or a software feature of the terminal device, where the first user identifier includes: a user telephone number and/or ID information, the hardware feature of the terminal device includes a manufacturer serial number, and the software feature of the terminal device includes an operating system version number.

Further, the receiver is further configured to: when the distribution request sent by the sender does not satisfy the preset criterion of the application distribution server, receive a failure message sent by the application distribution server. The terminal device further includes a processor, configured to stop the distribution applying process after the receiver receives the failure message.

Further, the sender is further configured to send the propagation code received by the receiver to the second terminal through short-distance communication. Alternatively, the sender is further configured to send the propagation code received by the receiver to the Internet, so that the second terminal acquires the propagation code.

The propagation code is used for identifying a category of an application, describing a feature of the application, and identifying the first user identifier and a propagation sequence number.

The application is a soft SIM card.

With reference to the seventh aspect or the first possible implementation manner of the seventh aspect, in a second possible implementation manner, the distribution request sent by the sender satisfying the preset criterion of the application distribution server includes that if the requested service category belongs to a service category included in the application distribution server, and the manufacturer serial number of the terminal device and/or the operating system version number of the terminal device is the same as a set manufacturer serial number and/or operating system version number of the application distribution server, the distribution request satisfies the preset criterion of the application distribution server.

In an eighth aspect, a server is provided, which includes a receiver, configured to receive a distribution request sent by a first terminal. A processor is configured to determine whether the distribution request received by the receiver satisfies a preset criterion. A sender is configured to send at least one propagation code to the first terminal when the processor determines that the distribution request satisfies the preset criterion.

The distribution request received by the receiver at least carries a first user identifier, a requested service category, and a hardware feature and/or a software feature of a terminal device, where the first user identifier includes: a user telephone number and/or ID information, the hardware feature of the terminal device includes: a manufacturer serial number, and the software feature of the terminal device includes: an operating system version number.

Further, the sender is further configured to send a failure message to the first terminal when the processor determines that the distribution request does not satisfy the preset criterion.

Further, the receiver is further configured to receive a registration request sent by a second terminal. The registration request at least carries the propagation code and a second user identifier.

Further, the receiver is further configured to: receive a running and tracking request sent by a second terminal. The running and tracking request at least carries the propagation code and the second user identifier.

The propagation code is used for identifying a category of an application, describing a feature of the application, and identifying the first user identifier and a propagation sequence number.

The application is a soft SIM card.

Further, the sender is further configured to send soft SIM card data to the second terminal after the receiver receives the registration request sent by the second terminal.

With reference to the eighth aspect or the first possible implementation manner of the eighth aspect, in a second possible implementation manner, the processor is specifically configured to determine that the distribution request satisfies the preset criterion when the requested service category belongs to a service category included in the server, and the manufacturer serial number of the terminal device and/or the operating system version number of the terminal device is the same as a set manufacturer serial number and/or operating system version number of the server.

In a ninth aspect, a terminal device is provided, which includes a processor configured to acquire a propagation code released by a first terminal. A sender is configured to send a registration request to an application distribution server to apply for installation and registration of an application. The registration request at least carries the propagation code acquired by the processor and a second user identifier. The sender is configured to, after the registration is successful and whenever the application runs, send a running and tracking request to the application distribution server. The running and tracking request at least carries the propagation code acquired by the processor and the second user identifier.

In a first possible implementation manner, the processor is further configured to receive the propagation code from the first terminal through short-distance communication. Alternatively, the processor is further configured to acquire, through the Internet, the propagation code released by the first terminal.

The application is a soft SIM card.

Further, the processor is further configured to receive soft SIM card data sent by the application distribution server, and import the soft SIM card data into a soft SIM card application after the sender sends the registration request to the application distribution server.

Compared with the prior art, in the embodiments of the present invention, a first terminal applies to an application distribution server for a propagation code, receives, after a criterion of the application distribution server is satisfied, the propagation code sent by the application distribution server, and propagates the propagation code to a second terminal through short-distance communication or the Internet, so that the second terminal acquires the propagation code. After acquiring the propagation code, the second terminal sends a registration request to the application distribution server according to the propagation code to apply for installation and registration of an application, and completes the application distribution process. The application distribution method provided in the present invention solves the problem that it is difficult for a user to acquire an application due to a limited acquiring channel. The user changes from a subscriber of an application to a propagator of the application, which significantly increases a propagation channel of the application, develops potential clients, and improves user experience and propagation efficiency of the application.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In order to make the advantages of the technical solutions of the present invention more clearly, the following describes in detail the present invention with reference to the accompanying drawings and the embodiments.

Figure 1:
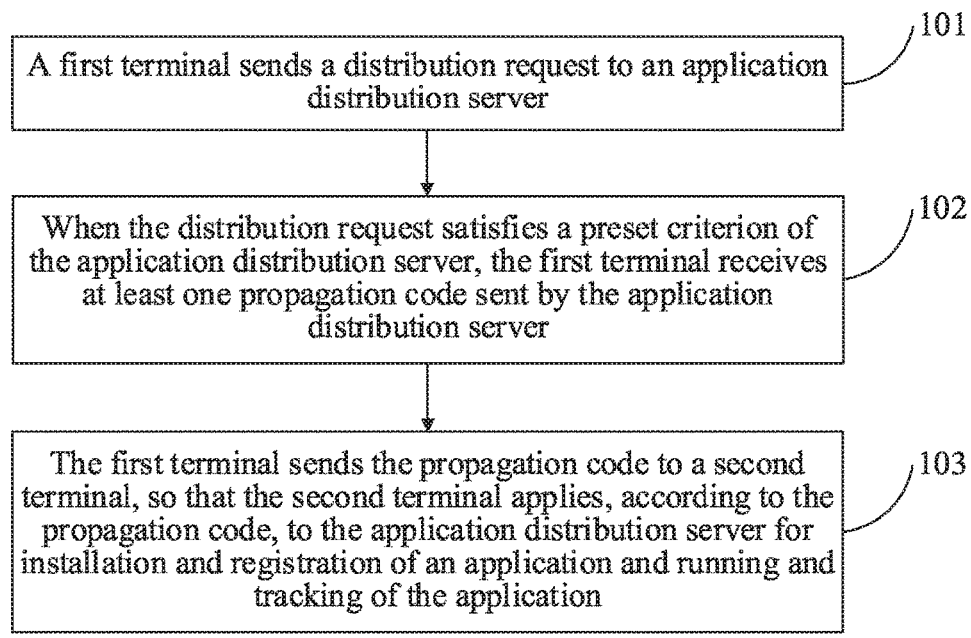
FIG. 1 is a flowchart of a method according to an embodiment of the present invention.

An embodiment of the present invention provides an application distribution method, and as shown in FIG. 1, the method includes the following steps.

101. A first terminal sends a distribution request to an application distribution server.

The distribution request at least carries a user identifier, a requested service category, and a hardware feature and/or a software feature of a terminal device, where the user identifier includes: a user telephone number and/or ID information, the hardware feature of the terminal device includes: a manufacturer serial number, and the software feature of the terminal device includes: an operating system version number.

102. When the distribution request satisfies a preset criterion of the application distribution server, the first terminal receives at least one propagation code sent by the application distribution server.

Optionally, the distribution request satisfying the preset criterion of the application distribution server includes that: if the requested service category belongs to a service category included in the application distribution server, and the manufacturer serial number of the terminal device and/or the operating system version number of the terminal device is the same as a set manufacturer serial number and/or operating system version number of the application distribution server, the distribution request satisfies the preset criterion of the application distribution server.

Optionally, when the distribution request does not satisfy the preset criterion of the application distribution server, a failure message sent by the application distribution server is received, and the distribution applying process is stopped.

Optionally, one or more propagation codes may be sent to the first terminal.

103. The first terminal sends the propagation code to a second terminal, so that the second terminal applies, according to the propagation code, to the application distribution server for installation and registration of an application and running and tracking of the application.

Optionally, the sending the propagation code to a second terminal includes sending the propagation code to the second terminal through short-distance communication. Alternatively, the propagation code is sent to the Internet, so that the second terminal acquires the propagation code.

The propagation code is used for identifying a category of an application, describing a feature of the application, and identifying the first user identifier and a propagation sequence number. The first user identifier is used for indicating from which terminal the propagation code is propagated, that is, indicating which propagation channel of the propagation code is used. The propagation sequence number is identifier information generated by the application distribution server when the application distribution server sends the propagation code. Whenever delivering a propagation code, the application distribution server adds the propagation sequence number by 1. For example, if the propagation sequence number of the first propagation code delivered by the application distribution server after initialization is 0, the propagation sequence number of the second delivered propagation code is 1, and the rest can be deduced by analog. Meanwhile, the application distribution server records the propagation sequence number in the propagation code and on the server side, so that when the second terminal uses the propagation code to apply for registration, the application distribution server can rapidly find corresponding application content. The application may be a soft SIM card.

Compared with the prior art, in this embodiment of the present invention, a terminal sends a distribution request to an application distribution server, receives, when the request satisfies a preset criterion of the application distribution server, a propagation code sent by the application distribution server, and propagates the propagation code through short-distance communication or the Internet to a second terminal for use, so that the second terminal applies, according to the propagation code, to the application distribution server for installation and registration of an application and running and tracking of the application. This solves the problem that the terminal can only act as a subscriber of an application, and the terminal changes from a subscriber to a propagator, which expands a propagation channel of the application.

Figure 2:
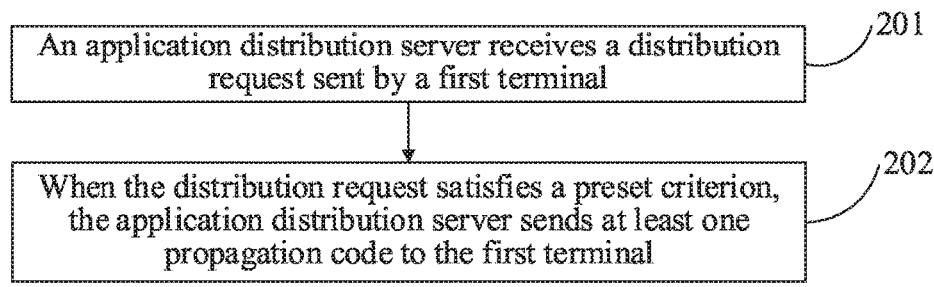
FIG. 2 is a flowchart of a method according to another embodiment of the present invention.

Still another embodiment of the present invention provides an application distribution method, and as shown in FIG. 2, the method includes the following steps.

201. An application distribution server receives a distribution request sent by a first terminal.

The distribution request at least carries a user identifier, a requested service category, and a hardware feature and/or a software feature of a terminal device, where the user identifier includes: a user telephone number and/or ID information, the hardware feature of the terminal device includes: a manufacturer serial number, and the software feature of the terminal device includes: an operating system version number.

202. When the distribution request satisfies a preset criterion, the application distribution server sends at least one propagation code to the first terminal.

Optionally, the distribution request satisfying the preset criterion includes that:

if the requested service category belongs to a service category included in the server, and the manufacturer serial number of the terminal device and/or the operating system version number of the terminal device is the same as a set manufacturer serial number and/or operating system version number of the server, the distribution request satisfies the preset criterion.

Optionally, when the distribution request does not satisfy the preset criterion, a failure message is sent to the first terminal.

Optionally, one or more propagation codes may be sent to the first terminal.

Further, after a second terminal acquires the propagation code, the method further includes receiving, by the application distribution server, a registration request sent by the second terminal. The registration request at least carries the propagation code and a second user identifier.

Further, the method further includes: receiving, by the application distribution server, a running and tracking request sent by the second terminal, where the running and tracking request at least carries the propagation code and the second user identifier.

The propagation code is used for identifying a category of an application, describing a feature of the application, and identifying the first user identifier and a propagation sequence number. The first user identifier is used for indicating from which terminal the propagation code is propagated, that is, indicating a specific propagation channel of the propagation code. The propagation sequence number is identifier information generated by the application distribution server when the application distribution server sends the propagation code. Whenever delivering a propagation code, the application distribution server adds the propagation sequence number by 1. For example, if the propagation sequence number of the first propagation code delivered by the application distribution server after initialization is 0, the propagation sequence number of the second delivered propagation code is 1, and the rest can be deduced by analog. Meanwhile, the application distribution server records the propagation sequence number in the propagation code and on the server side, so that when the second terminal uses the propagation code to apply for registration, the application distribution server can rapidly find corresponding application content. The application may be a soft SIM card.

Further, after the receiving a registration request sent by the second terminal, the method further includes: sending soft SIM card data to the second terminal.

Compared with the prior art, in this embodiment of the present invention, an application distribution server determines a distribution request of a first terminal and sends a propagation code to the first terminal when the distribution request satisfies a preset criterion, so that the first terminal sends the propagation code to a second terminal for use. This increases a propagation channel of an application and solves the problem that the application distribution server can only provide an application download service for a terminal instead of providing an application distribution service, and more application propagation channels are provided for the terminal.

Figure 3:
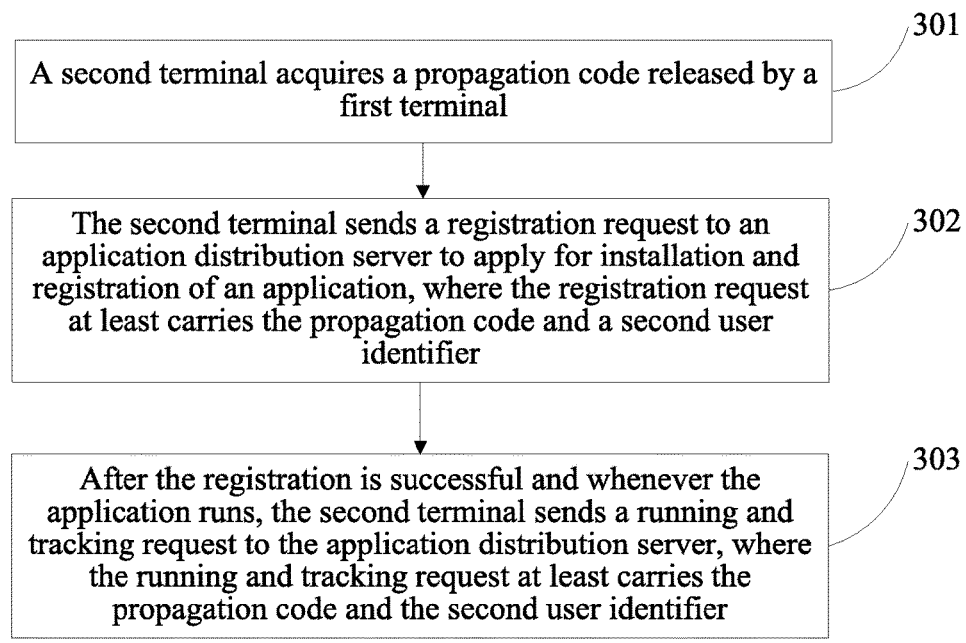
FIG. 3 is a flowchart of a method according to another embodiment of the present invention.

Still another embodiment of the present invention provides an application distribution method, and as shown in FIG. 3, the method includes the following steps.

301. A second terminal acquires a propagation code released by a first terminal.

Optionally, the acquiring a propagation code released by a first terminal includes receiving the propagation code from the first terminal through short-distance communication; or acquiring, through the Internet, the propagation code released by the first terminal.

302. The second terminal sends a registration request to an application distribution server to apply for installation and registration of an application, where the registration request at least carries the propagation code and a second user identifier.

303. After the registration is successful and whenever the application runs, the second terminal sends a running and tracking request to the application distribution server, where the running and tracking request at least carries the propagation code and the second user identifier.

The application may be a soft SIM card.

Further, after the sending a registration request to an application distribution server, the method further includes receiving soft SIM card data sent by the application distribution server, and importing the soft SIM card data into a soft SIM card application.

Compared with the prior art, in this embodiment of the present invention, a second terminal acquires a propagation code released by a first terminal, then applies, according to the propagation code, to an application distribution server for registration of a particular application, receives and saves related data after obtaining permission of the application distribution server, imports the propagation code into the application when a user needs to use the application, and sends a running and tracking request to the application distribution server whenever the application runs, so that the application distribution server maintains a use condition of the application. This solves the problem that an application acquiring channel of a terminal is limited, and the terminal can conveniently and rapidly acquire a desired application through another terminal, which avoids a waste of time in searching among multiple applications in an application store and improves user experience.

Figure 4:
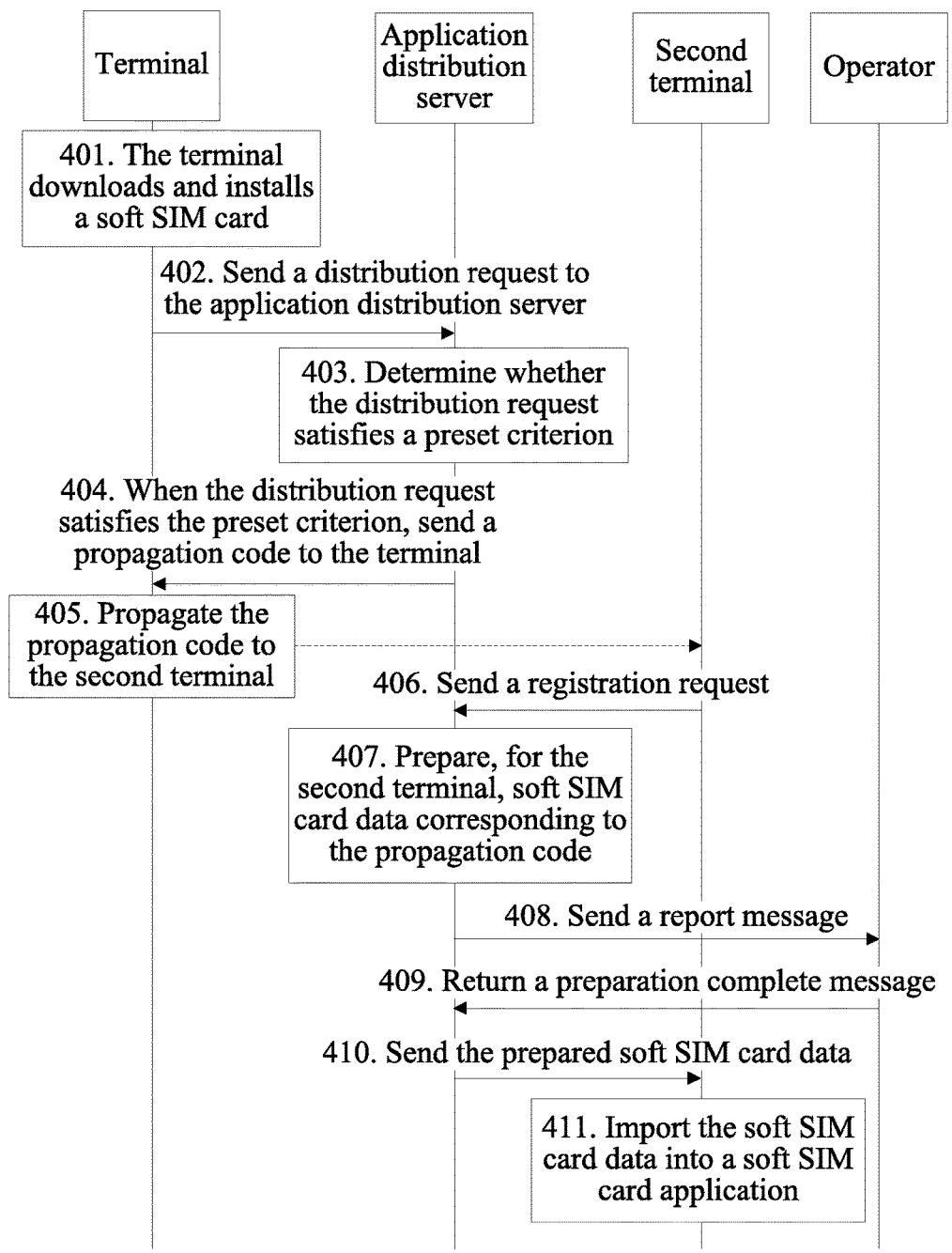
FIG. 4 is a flowchart of a method according to another embodiment of the present invention.

Still another embodiment of the present invention provides an application distribution method, in which a soft SIM (Subscriber Identity Module, subscriber identity module) card application is used as an example. A terminal installs a soft SIM card, applies to an application distribution server for a propagation code, and propagates the propagation code to another terminal, so that the another terminal downloads the soft SIM card from the application distribution server and registers the soft SIM card to the application distribution server. As shown in FIG. 4, the method includes the following steps.

401. A terminal downloads and installs a soft SIM card.

For example, a soft SIM card may be purchased and downloaded from a frequently visited on-line application store and installed, or purchased, downloaded, and installed through software such as a phone assistant. A server of the on-line store or the phone assistant may be regarded as a specific form of an application distribution server. Before providing download for a terminal, the application distribution server needs to send a soft SIM card application acquiring request to an operator and applies for a soft SIM program.

For example, the application acquiring request at least carries: a content type, a content identifier, and the quantity of an applied application. The content type includes: an executable code and soft SIM card data; when the executable code of the application already exists in the server, the content type can only include the soft SIM card data. The content identifier is used for indicating a specific category of the applied application, for example, soft SIM card application, map, book, or game. The quantity refers to the quantity of executable codes and soft SIM card data that are returned by the operator. As for the application distribution server side, the quantity of the executable codes is generally 1 because an executable code is the main part of an application, the main part of the application downloaded from the application distribution server by different terminal users that download the same application is the same, and only the soft SIM card data differs according to different requirements of the users on a program function.

It should be noted that different from a physical SIM card currently used by a user, a soft SIM card is a virtual SIM card program, and a user can use the soft SIM card to implement a communication service after simple authorization and installation just like using the physical SIM card. For a user who intends to change a card, for example, to switch between SIM cards of different operators in a country, or to use a local SIM card when going abroad so as to avoid expensive roaming fees, it is inconvenient to buy a replaceable SIM card instantly. Especially in a foreign country, the purchase of a SIM card may be rather troublesome due to unfamiliarity of a local language and a purchase process. The use of a soft SIM card is relatively much easier. The user can purchase soft SIM card programs of different operators in advance, and download the programs to the terminal. When a communication service of a certain operator is required, the user only needs to run a corresponding application or switch corresponding soft SIM card data.

Optionally, content of a soft SIM card application is shown in Table 1:

TABLE 1

| Application | Soft SIM card application | Remarks |
| --- | --- | --- |
| Executable code | Soft SIM card client software | Different operators may have different client software |
| Propagation code | Product identifier + distributor user identifier + propagation code sequence number | |
| Application data | Soft SIM card data | |

The executable code is an application downloaded to a terminal. The propagation code is acquired from another terminal or the Internet, which identifies a way of acquiring the executable code or acquiring the executable code and the soft SIM card data. The soft SIM card data is data organized according to a related international standard and is similar to data in a hard SIM card.

It should be noted that before the application distribution server acquires an application from an operator, the application distribution server needs to establish secure communication connection with a device of the operator, for example, the application distribution server and the device of the operator may be connected by using a P1 interface and through the public Internet or a VPN (Virtual Private Network, virtual private network), interaction between the two follows transmission protocols such as the TCP (Transmission Control Protocol, Transmission Control Protocol) \HTTP (Hyper Text Transport Protocol, Hypertext Transport Protocol)\HTTPS (Hyper Text Transfer Protocol Secure, Hyper Text Transfer Protocol Secure), and transmitted content is a formatted message. Then, the application distribution server needs to register to and log in to the device of the operator to obtain authentication of the device of the operator.

Optionally, if an application corresponding to a category or content of the application requested by the application distribution server side does not exist in a system warehouse of the operator, the operator may return a failure message to the application distribution server, and the application distribution server ends the application acquiring request process according to the failure message.

Optionally, the application distribution server may acquire applications from multiple operators, and to better manage the acquired applications by category, an application warehouse that is used specially for saving application data needs to be established on the application distribution server side.

402. After running the soft SIM card application, the terminal sends a distribution request to the application distribution server.

For example, the distribution request at least carries: a user identifier, a requested service category, and a hardware feature and/or a software feature of a terminal device. The user identifier may be a mobile phone number used by a user or a user name of the soft SIM card registered by the user and is used for indicating identity information of the user; the requested service category is corresponding to the service category of the soft SIM card; and the hardware feature and/or software feature of the terminal device is used for indicating whether the terminal is qualified for applying for distribution, for example, the hardware feature may be a manufacturer serial number of the terminal, and the software feature may be the version number of an operating system used by the terminal.

It should be noted that before the terminal sends the distribution request to the application distribution server, the terminal needs to establish secure communication connection with the application distribution server, for example, the terminal and the application distribution server may be connected by using a P2 interface and through the public Internet, interaction between the two follows transmission protocols such as the TCP (Transmission Control Protocol, Transmission Control Protocol)\HTTP (Hyper Text Transport Protocol, Hypertext Transport Protocol)\HTTPS (Hyper Text Transfer Protocol Secure, Hyper Text Transfer Protocol Secure), and transmitted content is a formatted message. Then, the terminal needs to register to and log in to the application distribution server by using the application.

403. The application distribution server determines whether the distribution request satisfies a preset criterion.

Optionally, if the requested service category of the terminal belongs to a service category included in the application distribution server, and the manufacturer serial number of the terminal device and/or the operating system version number of the terminal device is the same as a set manufacturer serial number and/or operating system version number of the application distribution server, the distribution request satisfies the preset criterion of the application distribution server. If the requested service category of the terminal does not belong to a service category included in the application distribution server, or the manufacturer serial number of the terminal device and/or the operating system version number of the terminal device is different from a set manufacturer serial number and/or operating system version number of the application distribution server, the distribution request does not satisfy the preset criterion of the application distribution server.

404. When the distribution request satisfies the preset criterion, the application distribution server sends a propagation code to the terminal.

Optionally, when the distribution request does not satisfy the preset criterion, send a failure message to the terminal, so that the terminal ends the distribution applying process.

The propagation code is used for identifying a category of an application, describing a feature of the application, and identifying the first user identifier and a propagation sequence number. For example, the propagation code identifies a category of a soft SIM card and is attached with a text description used to describe a function and a feature of the soft SIM card, so that the user that does not install the soft SIM card can have a general understanding of the soft SIM card application after obtaining the propagation code. The first user identifier is used for indicating from which terminal the propagation code is propagated, that is, indicating a specific propagation channel of the propagation code. For example, the first user identifier may be an identifier of a terminal user that distributes the propagation code, and may be a download network address of the soft SIM card, for example, a network address of a forum, a network address of an application store, or a download address of the soft SIM card in the application distribution server. The propagation sequence number is identifier information generated by the application distribution server when the application distribution server sends the propagation code. Whenever delivering a propagation code, the application distribution server adds the propagation sequence number by 1. For example, if the propagation sequence number of the first propagation code delivered by the application distribution server after initialization is 0, the propagation sequence number of the second delivered propagation code is 1, and the rest can be deduced by analog. Meanwhile, the application distribution server records the propagation sequence number in the propagation code and on the server side, so that when a second terminal uses the propagation code to apply for registration, the application distribution server can rapidly find corresponding application content.

Optionally, the application distribution server may send one or more propagation codes to the terminal, and a specific quantity of the propagation codes is decided by the distribution request of the terminal.

405. After receiving the propagation code, the terminal propagates the propagation code to the second terminal.

Optionally, when the terminal is close to the second terminal, the terminal and the second terminal may be associated through short-distance communication, for example, through WiFi (Wireless Fidelity, wireless fidelity), Bluetooth, NFC (Near Field Communication, near field communication), or the like; and after the association, the terminal directly sends the propagation code and a soft SIM card application corresponding to the propagation code to the second terminal; or, the terminal sends, through the Internet, the propagation code and a soft SIM card application corresponding to the propagation code to various network forums or social networks for download by the second terminal in need.

Optionally, the second terminal may only acquire one propagation code among the propagation codes obtained by the terminal in step 404, and may also acquire multiple propagation codes among the propagation codes obtained by the terminal in step 404. Each propagation code may be used to generate one or more telephone numbers.

It should be noted that communication connection between the terminal and the second terminal may be established by using a P3 interface, interaction between the second terminal and the terminal follows transmission protocols such as the TCP (Transmission Control Protocol, Transmission Control Protocol)\HTTP (Hyper Text Transport Protocol, Hypertext Transport Protocol)\HTTPS (Hyper Text Transfer Protocol Secure, Hyper Text Transfer Protocol Secure), and transmitted content is a formatted message.

406. The second terminal acquires the propagation code and the soft SIM card application, starts to install the application, and sends a registration request to the application distribution server according to the propagation code in the installation process, so as to apply for installation and registration of the application.

The registration request at least carries the propagation code and a second user identifier. The propagation code is used for indicating, to the application distribution server, that the second terminal intends to purchase a soft SIM card service and a function of the soft SIM card service to be purchased, where the soft SIM card service may be corresponding to multiple propagation codes. The propagation code is used for identifying a category of an application and describing a feature of the application, and function rights of soft SIM cards downloaded and registered by the terminal according to different propagation codes are different. The second user identifier is used for indicating the identity of the second terminal, so that the application distribution server sends the soft SIM card data to the second terminal.

407. The application distribution server prepares, for the second terminal, soft SIM card data corresponding to the propagation code.

408. The application distribution server sends a report message to the operator. This step is optional.

The report message is used for notifying the operator that a new user subscribes to a service, so that the operator makes service preparation for providing a corresponding data service for the user of the second terminal.

409. The operator returns a preparation complete message to the application distribution server. This step is optional.

410. The application distribution server sends the prepared soft SIM card data to the second terminal.

411. The second terminal imports the soft SIM card data into the soft SIM card application.

Optionally, whenever the soft SIM card program runs, the second terminal needs to send a running and tracking request to the application distribution server, so that the application distribution server tracks a use condition of the soft SIM card used by the second terminal.

Optionally, the application distribution server may also obtain the running and tracking information from the operator and does not require the second terminal to report the running and tracking information.

It should be noted that the propagation code identifies a propagation channel, that is, from where the propagation code is propagated. In this embodiment, when the second terminal uses the propagation code for registration, the operator can learn that the propagation code used by the second terminal is propagated by the terminal, and when the second terminal pays for using the soft SIM card, the operator can provide proper profit sharing for the terminal, so as to encourage the terminal to propagate the soft SIM card. In this way, a new service can be rapidly promoted for the operator.

Compared with the prior art, in this embodiment of the present invention, a terminal first installs a soft SIM card application and applies to an application distribution server for a propagation code, receives, after a criterion of the application distribution server is satisfied, the propagation code sent by the application distribution server, and then propagates the propagation code to a second terminal through short-distance communication or the Internet, so that the second terminal acquires the propagation code; finally, the second terminal acquires the propagation code, sends a registration request to the application distribution server according to the propagation code to apply for installation and registration of an application, and completes the application distribution process. The second terminal can also initiate a distribution request to the application distribution server, and if the distribution request satisfies the preset criterion of the application distribution server, the second terminal can also acquire the propagation code and propagate the propagation code to another terminal. The application distribution method provided in the present invention solves the problem that it is difficult for a user to acquire an application due to a limited acquiring channel. The user changes from a subscriber of an application to a propagator of the application, which significantly increases a propagation channel of the application, develops potential clients, and improves user experience and propagation efficiency of the application.

Figure 5:
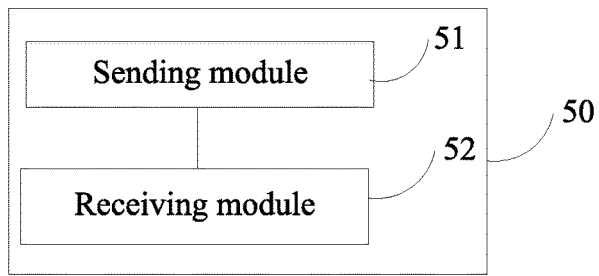
FIG. 5 and FIG. 6 are schematic structural diagrams of a first terminal according to an embodiment of the present invention.

Still another embodiment of the present invention provides a terminal device 50, and as shown in FIG. 5, the terminal device 50 includes the following steps. A sending module 51 is configured to send a distribution request to an application distribution server; and configured to send a propagation code to a second terminal, so that the second terminal applies, according to the propagation code, to the application distribution server for installation and registration of an application and running and tracking of the application. A receiving module 52 is configured to, when the distribution request sent by the sending module 51 satisfies a preset criterion of the application distribution server, receive at least one propagation code sent by the application distribution server.

The distribution request sent by the sending module 51 at least carries a first user identifier, a requested service category, and a hardware feature and/or a software feature of the terminal device, where the first user identifier includes: a user telephone number and/or ID information, the hardware feature of the terminal device includes: a manufacturer serial number, and the software feature of the terminal device includes: an operating system version number.

Optionally, the distribution request sent by the sending module 51 satisfies the preset criterion of the application distribution server if the requested service category belongs to a service category included in the application distribution server, and the manufacturer serial number of the terminal device and/or the operating system version number of the terminal device is the same as a set manufacturer serial number and/or operating system version number of the application distribution server.

Figure 6:
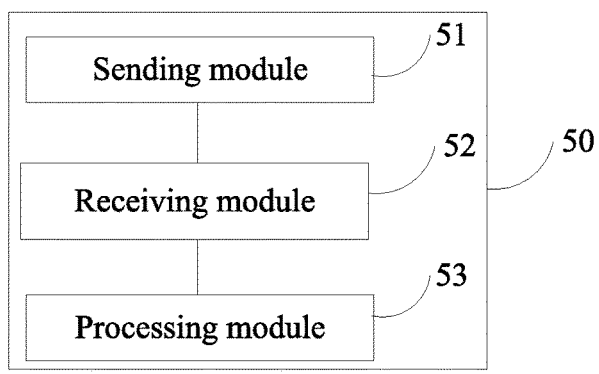

Further, the receiving module 52 is further configured to receive a failure message sent by the application distribution server, when the distribution request does not satisfy the preset criterion of the application distribution server. As shown in FIG. 6, the terminal device 50 further includes a processing module 53 configured to stop the distribution applying process after the receiving module 52 receives the failure message.

Further, the sending module 51 is further configured to send the propagation code received by the receiving module 52 to the second terminal through short-distance communication. Alternatively, the sending module 51 is further configured to send the propagation code received by the receiving module 52 to the Internet, so that the second terminal acquires the propagation code.

The propagation code is used for identifying a category of an application, describing a feature of the application, and identifying the first user identifier and a propagation sequence number. The application may be a soft SIM card.

Compared with the prior art, in this embodiment of the present invention, the terminal device 50 sends a distribution request to an application distribution server, receives, when the request satisfies a preset criterion of the application distribution server, a propagation code sent by the application distribution server, and propagates the propagation code through short-distance communication or the Internet to a second terminal for use, so that the second terminal applies, according to the propagation code, to the application distribution server for installation and registration of an application and running and tracking of the application. This solves the problem that the terminal device 50 can only act as a subscriber of an application, and the terminal device 50 changes from a subscriber to a propagator, which expands a propagation channel of the application.

Figure 7:
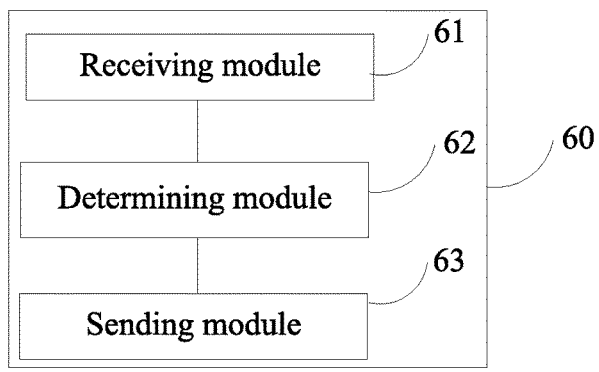
FIG. 7 is a schematic structural diagram of an application distribution server according to an embodiment of the present invention.

Still another embodiment of the present invention provides a server 60, and as shown in FIG. 7, the server 60 includes a receiving module 61, configured to receive a distribution request sent by a first terminal. A determining module 62 is configured to determine whether the distribution request received by the receiving module 61 satisfies a preset criterion. A sending module 63 is configured to send at least one propagation code to the first terminal when the determining module 62 determines that the distribution request satisfies the preset criterion.

The distribution request received by the receiving module 61 at least carries a first user identifier, a requested service category, and a hardware feature and/or a software feature of a terminal device, where the first user identifier includes: a user telephone number and/or ID information, the hardware feature of the terminal device includes: a manufacturer serial number, and the software feature of the terminal device includes: an operating system version number.

Optionally, the determining module 62 is specifically configured to determine that the distribution request satisfies the preset criterion when the requested service category belongs to a service category included in the server, and the manufacturer serial number of the terminal device and/or the operating system version number of the terminal device is the same as a set manufacturer serial number and/or operating system version number of the server.

Further, the sending module 63 is further configured to send a failure message to the first terminal when the determining module 62 determines that the distribution request does not satisfy the preset criterion.

Further, the receiving module 61 is further configured to receive a registration request sent by a second terminal. The registration request at least carries the propagation code and a second user identifier.

Further, the receiving module 61 is further configured to receive a running and tracking request sent by the second terminal. The running and tracking request at least carries the propagation code and the second user identifier.

The propagation code is used for identifying a category of an application, describing a feature of the application, and identifying the first user identifier and a propagation sequence number. The application may be a soft SIM card.

Further, the sending module 63 is further configured to send soft SIM card data to the second terminal after the receiving module 61 receives the registration request sent by the second terminal.

Compared with the prior art, in this embodiment of the present invention, the server 60 determines a distribution request of a first terminal and sends a propagation code to the first terminal when the distribution request satisfies a preset criterion, so that the first terminal sends the propagation code to a second terminal for use. This increases a propagation channel of an application and solves the problem that the server 60 can only provide an application download service for a terminal instead of providing an application distribution service, and more application propagation channels are provided for the terminal.

Figure 8:
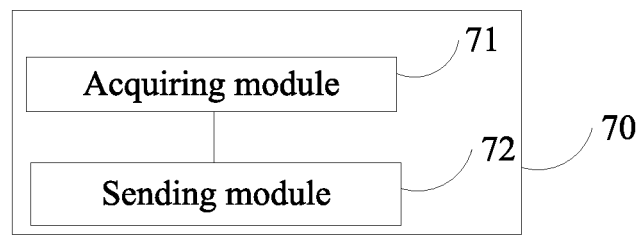
FIG. 8 and FIG. 9 are schematic structural diagrams of a second terminal according to an embodiment of the present invention.

Still another embodiment of the present invention provides a terminal device 70, and as shown in FIG. 8, the terminal device 70 includes an acquiring module 71 configured to acquire a propagation code released by a first terminal. A sending module 72 is configured to send a registration request to an application distribution server to apply for installation and registration of an application. The registration request at least carries the propagation code acquired by the acquiring module 71 and a second user identifier. The sending module 72 is configured to send a running and tracking request to the application distribution server after the registration is successful and whenever the application runs. The running and tracking request at least carries the propagation code acquired by the acquiring module 71 and the second user identifier.

Optionally, the acquiring module 71 is further configured to receive the propagation code from the first terminal through short-distance communication; or acquire, through the Internet, the propagation code released by the first terminal.

The application may be a soft SIM card.

Figure 9:
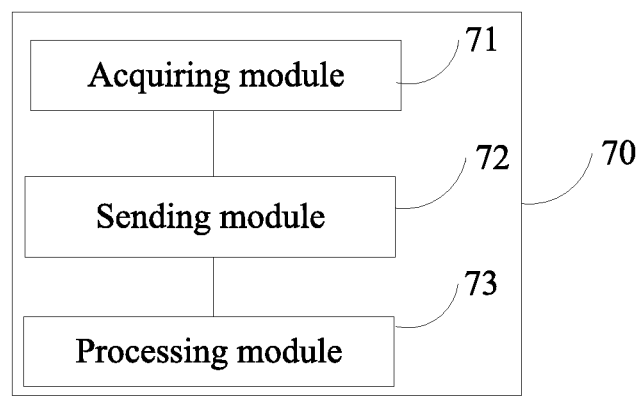

Further, as shown in FIG. 9, the terminal device 70 further includes a processing module 73, configured to, after the sending module 72 sends the registration request to the application distribution server, receive soft SIM card data sent by the application distribution server, and import the soft SIM card data into a soft SIM card application.

Compared with the prior art, in this embodiment of the present invention, the terminal device 70 acquires a propagation code released by a first terminal, then applies, according to the propagation code, to an application distribution server for registration of a particular application, receives and saves related data after obtaining permission of the application distribution server, imports the propagation code into the application when a user needs to use the application, and sends a running and tracking request to the application distribution server whenever the application runs, so that the application distribution server maintains a use condition of the application. This solves the problem that an application acquiring channel of a terminal device is limited, and the terminal device 70 can conveniently and rapidly acquire a desired application through another terminal device, which avoids a waste of time in searching among multiple applications in an application store and improves user experience.

Figure 10:
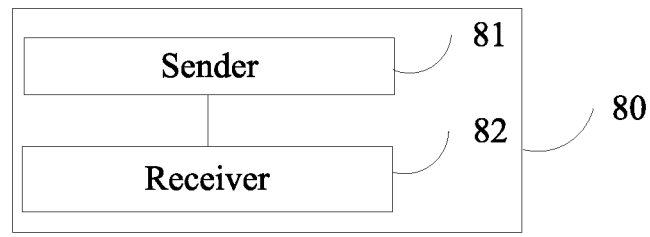
FIG. 10 and FIG. 11 are schematic structural diagrams of a first terminal according to another embodiment of the present invention.

Still another embodiment of the present invention provides a terminal device 80, and as shown in FIG. 10, the terminal device 80 includes a sender 81, configured to send a distribution request to an application distribution server; and configured to send a propagation code to a second terminal, so that the second terminal applies, according to the propagation code, to the application distribution server for installation and registration of an application and running and tracking of the application. A receiver 82 is configured to receive at least one propagation code sent by the application distribution server when the distribution request sent by the sender satisfies a preset criterion of the application distribution server.

The distribution request sent by the sender 81 at least carries a first user identifier, a requested service category, and a hardware feature and/or a software feature of the terminal device, where the first user identifier includes: a user telephone number and/or ID information, the hardware feature of the terminal device includes a manufacturer serial number, and the software feature of the terminal device includes an operating system version number.

Optionally, the distribution request sent by the sender 81 the distribution request satisfies the preset criterion of the application distribution server if the requested service category belongs to a service category included in the application distribution server, and the manufacturer serial number of the terminal device and/or the operating system version number of the terminal device is the same as a set manufacturer serial number and/or operating system version number of the application distribution server, the distribution request satisfies the preset criterion of the application distribution server.

Figure 11:
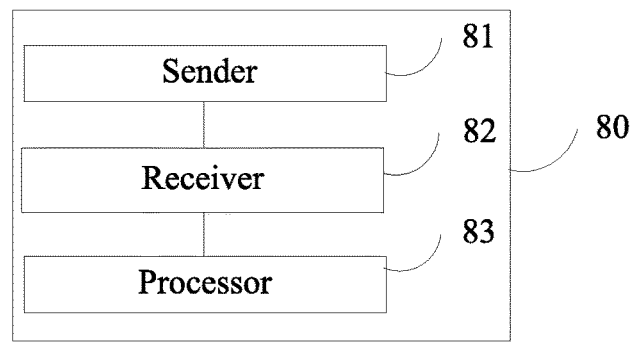

The receiver 82 is further configured to receive a failure message sent by the application distribution server when the distribution request sent by the sender 81 does not satisfy the preset criterion of the application distribution server. As shown in FIG. 11, the terminal device 80 further includes a processor 83, configured to stop the distribution applying process after the receiver receives the failure message.

Further, the sender 81 is further configured to send the propagation code received by the receiver 82 to the second terminal through short-distance communication. Alternatively, the sender 81 is further configured to send the propagation code received by the receiver 82 to the Internet, so that the second terminal acquires the propagation code.

The propagation code is used for identifying a category of an application, describing a feature of the application, and identifying the first user identifier and a propagation sequence number. The application may be a soft SIM card.

Compared with the prior art, in this embodiment of the present invention, the terminal device 80 sends a distribution request to an application distribution server, receives, when the request satisfies a preset criterion of the application distribution server, a propagation code sent by the application distribution server, and propagates the propagation code through short-distance communication or the Internet to a second terminal for use, so that the second terminal applies, according to the propagation code, to the application distribution server for installation and registration of an application and runs and tracks the application. This solves the problem that the terminal device 80 can only act as a subscriber of an application, and the terminal device 80 changes from a subscriber to a propagator, which expands a propagation channel of the application.

Figure 12:
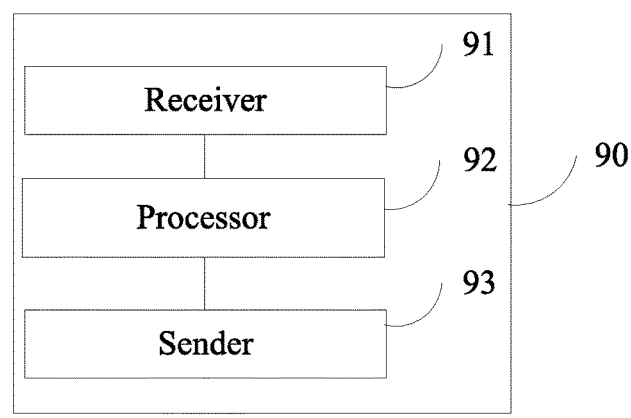
FIG. 12 is a schematic structural diagram of an application distribution server according to another embodiment of the present invention.

Still another embodiment of the present invention provides a server 90, and as shown in FIG. 12, the server 90 includes a receiver 91 configured to receive a distribution request sent by a first terminal. The server 90 further includes a processor 92 configured to determine whether the distribution request received by the receiver 91 satisfies a preset criterion. A sender 93 is configured to send at least one propagation code to the first terminal when the processor 92 determines that the distribution request satisfies the preset criterion.

The distribution request received by the receiver 91 at least carries a first user identifier, a requested service category, and a hardware feature and/or a software feature of a terminal device. The first user identifier includes a user telephone number and/or ID information, the hardware feature of the terminal device includes a manufacturer serial number, and the software feature of the terminal device includes an operating system version number.

Optionally, the processor 92 is specifically configured to determine that the distribution request satisfies the preset criterion when the requested service category belongs to a service category included in the server, and the manufacturer serial number of the terminal device and/or the operating system version number of the terminal device is the same as a set manufacturer serial number and/or operating system version number of the server.

Further, the sender 93 is further configured to send a failure message to the first terminal when the processor 92 determines that the distribution request does not satisfy the preset criterion.

Further, the receiver 91 is further configured to receive a registration request sent by a second terminal. The registration request at least carries the propagation code and a second user identifier.

Further, the receiver 91 is further configured to: receive a running and tracking request sent by the second terminal. The running and tracking request at least carries the propagation code and the second user identifier.

The propagation code is used for identifying a category of an application, describing a feature of the application, and identifying the first user identifier and a propagation sequence number. The application may be a soft SIM card.

Further, the sender 93 is further configured to send soft SIM card data to the second terminal after the receiver 91 receives the registration request sent by the second terminal.

Compared with the prior art, in this embodiment of the present invention, the server 90 determines a distribution request of a first terminal and sends a propagation code to the first terminal when the distribution request satisfies a preset criterion, so that the first terminal sends the propagation code to a second terminal for use. This increases a propagation channel of an application and solves the problem that the server 90 can only provide an application download service for a terminal instead of providing an application distribution service, and more application propagation channels are provided for the terminal.

Figure 13:
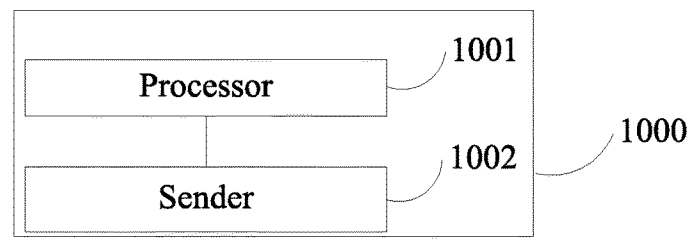
FIG. 13 is a schematic structural diagram of a second terminal according to another embodiment of the present invention.

Still another embodiment of the present invention provides a terminal device 1000, and as shown in FIG. 13, the terminal device 1000 includes the following steps. A processor 1001 is configured to acquire a propagation code released by a first terminal. A sender 1002 is configured to send a registration request to an application distribution server to apply for installation and registration of an application. The registration request at least carries the propagation code acquired by the processor 1001 and a second user identifier. The sender 1002 is configured to send a running and tracking request to the application distribution server after the registration is successful and whenever the application runs. The running and tracking request at least carries the propagation code acquired by the processor 1001 and the second user identifier.

Further, the processor 1001 is further configured to receive the propagation code from the first terminal through short-distance communication; or acquire, through the Internet, the propagation code released by the first terminal.

The application may be a soft SIM card.

Further, the processor 1001 is further configured to, after the sender 1002 sends the registration request to the application distribution server, receive soft SIM card data sent by the application distribution server, and import the soft SIM card data into a soft SIM card application.

Compared with the prior art, in this embodiment of the present invention, the terminal device 1000 acquires a propagation code released by a first terminal, then applies, according to the propagation code, to an application distribution server for registration of a particular application, receives and saves related data after obtaining permission of the application distribution server, imports the propagation code into the application when a user needs to use the application, and sends a running and tracking request to the application distribution server whenever the application runs, so that the application distribution server maintains a use condition of the application. This solves the problem that an application acquiring channel of the terminal device 1000 is limited, and the terminal device 1000 can conveniently and rapidly acquire a desired application through another terminal device, which avoids a waste of time in searching among multiple applications in an application store and improves user experience.

Figure 14:
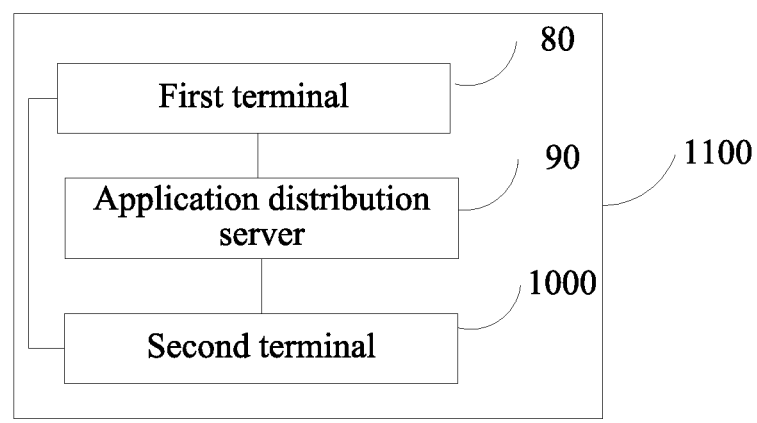
FIG. 14 is a schematic structural diagram of a communication system according to an embodiment of the present invention.

Still another embodiment of the present invention provides a communication system 1100, and as shown in FIG. 14, the communication system 1100 includes the terminal device 80, the server 90, and the terminal device 1000 described in the foregoing embodiments, where the server 90 is configured to send at least one propagation code to the terminal device 80. The terminal device 80 is configured to acquire the at least one propagation code from the server 90; and configured to release the propagation code, so that the terminal device 1000 acquires the propagation code. The terminal device 1000 is configured to acquire the propagation code released by the terminal device 80, and register to the server 90 according to the propagation code.

The terminal device and the server provided in the embodiments of the present invention can implement the method embodiments provided above. For implementation of specific functions, refer to the descriptions in the method embodiments, which are not repeated herein. The application distribution method, the terminal, and the server provided in the embodiments of the present invention can be applied to an intelligent terminal for acquiring and distributing an application, however, the present invention is not limited thereto.

Persons of ordinary skill in the art may understand that all or a part of the processes of the methods in the foregoing embodiments may be implemented by a computer program instructing relevant hardware. The program may be stored in a computer readable storage medium. When the program runs, the processes of the foregoing methods in the embodiments are performed. The storage medium may be a magnetic disk, an optical disk, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An application distribution method, comprising:
at a first terminal, establishing a secure communication connection between the first terminal with an application distribution server, the first terminal being connected with a first soft Subscriber Identity Module (SIM) card of the first terminal;
after establishing the secure communication connection, sending, by the first terminal, a distribution request to the application distribution server, the distribution request comprising a first user identifier of the first soft SIM card, a first hardware feature of the first terminal, and a first software feature of the first terminal;
wherein the first hardware feature comprises a manufacturer serial number of the first terminal, and
the first software feature comprises an operating system version number of the first terminal;
when the distribution request satisfies a preset criterion of the application distribution server, receiving at least one propagation code sent by the application distribution server,
wherein the preset criterion comprises matching the first hardware feature, and the first software feature with a set hardware feature and a software feature of the application distribution server; the matching comprising,
the manufacturer serial number of the first terminal and the operating system version number of the first terminal is the same as a set manufacturer serial number and operating system version number of the application distribution server,
wherein the propagation code is used for identifying a category of the first soft SIM card, describing a feature of the first soft SIM card, and identifying the first user identifier, and a propagation sequence number which is identifier information generated by the application distribution server, wherein the propagation sequence number is incremented and recorded by the application distribution server each time the application distribution server sends the propagation code to the first terminal;
sending the propagation code to a second terminal, so that the second terminal applies, according to the propagation code and a second user identifier, to the application distribution server, and
installing and registering of a second soft SIM card and running and tracking of the second soft SIM card, wherein the application distribution server finds corresponding application content according to the propagation sequence number.

2. The method according to claim 1, wherein the sending the propagation code to a second terminal comprises:
sending the propagation code to the second terminal through short-distance communication.

3. The method according to claim 1, wherein the sending the propagation code to a second terminal comprises:
sending the propagation code to the Internet, so that the second terminal acquires the propagation code.

4. The method according to claim 1, wherein when the distribution request does not satisfy the preset criterion of the application distribution server,
receiving a failure message sent by the application distribution server; and
stopping the distribution applying process.

5. A terminal device comprising:
a transmitter configured to
establish a secure communication connection between the terminal device with an application distribution server, the terminal device being connected with a first soft Subscriber Identity Module (SIM) card of the terminal device;
send a distribution request to the application distribution server, the distribution request comprising a first user identifier of the first soft SIM card, a first hardware feature of the terminal device, and a first software feature of the terminal device;
send a propagation code to a second terminal, so that the second terminal applies, according to the propagation code and a second user identifier, to the application distribution server, installing and registering of a second soft SIM card and running and tracking of the second soft SIM card, wherein the application distribution server finds corresponding application content according to a propagation sequence number: and
a receiver configured to receive at least one propagation code sent by the application distribution server when the distribution request sent by the transmitter satisfies a preset criterion of the application distribution server,
wherein the preset criterion comprises matching the first hardware feature and the first software feature with a set hardware feature and a software feature of the application distribution server, wherein the propagation code is used for identifying a category of the first soft SIM card, describing a feature of the first soft SIM card, and identifying the first user identifier, the matching comprising, wherein the first hardware feature comprises a manufacturer serial number of the first terminal, and the first software feature comprises an operating system version number of the first terminal;

and the propagation sequence number which is identifier information generated by the application distribution server, wherein the propagation sequence number is incremented and recorded by the application distribution server each time the application distribution server sends the propagation code to the terminal device.

6. The terminal device according to claim 5, wherein the transmitter is further configured to:

send the propagation code received by the receiver to the second terminal through short-distance communication.

7. The terminal device according to claim 5, wherein the transmitter is further configured to:

send the propagation code received by the receiver to the Internet, so that the second terminal acquires the propagation code.

8. The terminal device according to claim 5, wherein the receiver is further configured to: when the distribution request sent by the transmitter does not satisfy the preset criterion of the application distribution server, receive a failure message sent by the application distribution server; and the terminal device further comprises a processor, configured to stop the distribution applying process after the receiver receives the failure message.

9. A terminal device comprising:

a memory comprising a program;

a processor configured to execute the program, the program comprising instructions to acquire a propagation code released by a first terminal using a first soft SIM card, wherein the propagation code is used for identifying a category of the first soft SIM card, describing a hardware and software feature of the first soft SIM card, and identifying a first user identifier of the first terminal, wherein the first hardware feature comprises a manufacturer serial number of the first terminal, and the first software feature comprises an operating system version number of the first terminal;

and a propagation sequence number which is identifier information generated by an application distribution server, wherein the propagation sequence number is incremented and recorded by the application distribution server each time the application distribution server sends the propagation code to the first terminal; and a transmitter configured to send a registration request to an application distribution server to install and register of a second soft SIM card, wherein the registration request at least carries the propagation code acquired by the processor and a second user identifier, wherein the application distribution server finds corresponding application content according to the propagation sequence number: and send a running and tracking request to the application distribution server after successful registration and whenever the second soft SIM card runs, wherein the running and tracking request at least carries the propagation code acquired by the processor and the second user identifier.

10. The terminal device according to claim 9, wherein the program comprises further instructions for:

receiving the propagation code from the first terminal through short-distance communication; or acquiring, through the Internet, the propagation code released by the first terminal.

11. The terminal device according to claim 9, wherein the program further includes instructions for receiving soft SIM card data sent by the application distribution server, and importing the soft SIM card data into a soft SIM card application after the transmitter sends the registration request to the application distribution server.

* * * * *